No. 877,693.
PATENTED JAN. 28, 1908.
C. ANDERSON.
CORN PLANTER.
APPLICATION FILED MAR. 8, 1907.
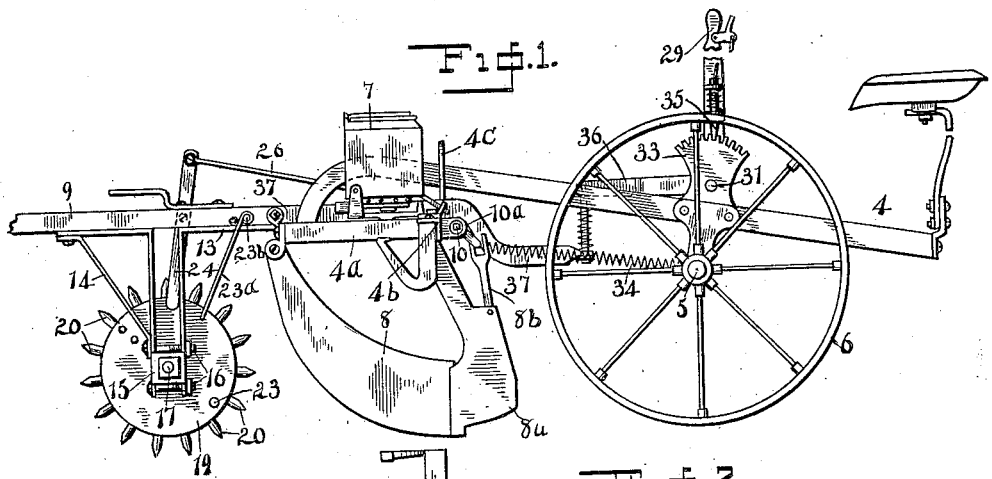
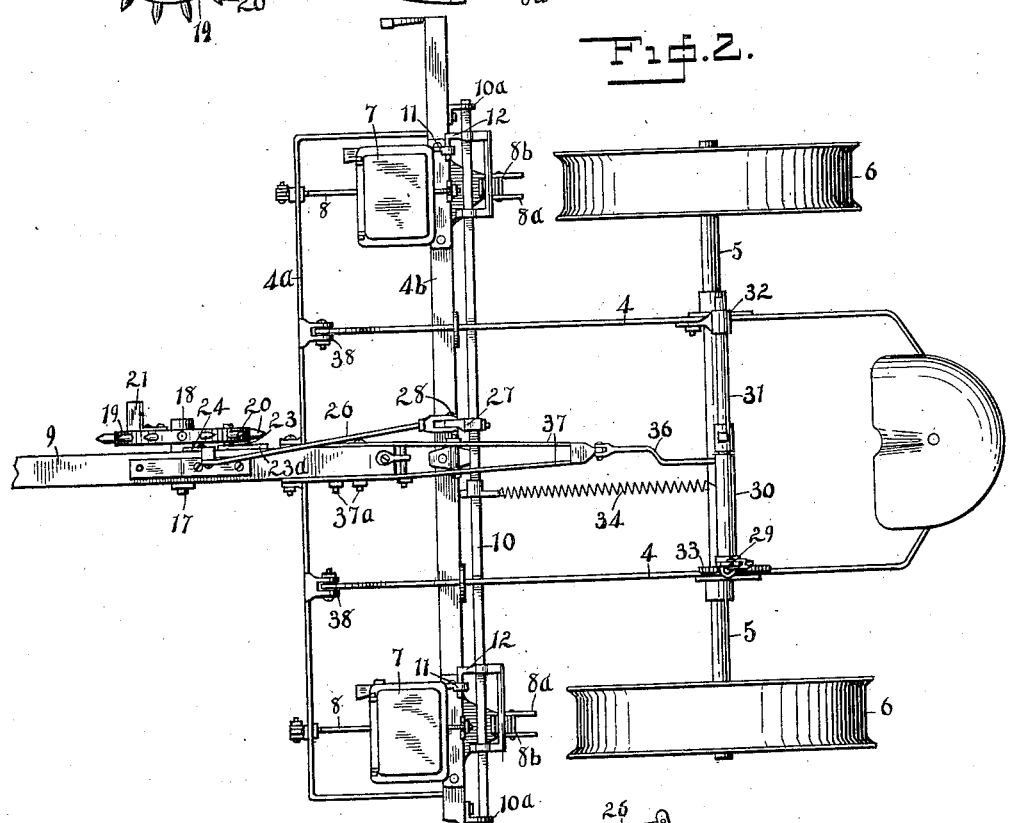
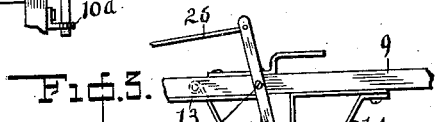
WITNESSES:
INVENTOR
Christopher Anderson
By Frederick Bujan
Att'y.

UNITED STATES PATENT OFFICE.

CHRISTOPHER ANDERSON, OF ROCK ISLAND, ILLINOIS.

CORN-PLANTER.

No. 877,693.   Specification of Letters Patent.   Patented Jan. 28, 1908.

Application filed March 8, 1907. Serial No. 361,303.

*To all whom it may concern:*

Be it known that I, CHRISTOPHER ANDERSON, citizen of the United States, residing at Rock Island, in the county of Rock Island and State of Illinois, have invented certain new and useful Improvements in Corn-Planters, of which the following is a specification.

This invention relates to improvements in corn planters and especially to the means for operating at predetermined intervals the dropping plates in the seed-boxes.

The object of the improvements which form the subject matter of this application is to produce seed planting means which will be accurate and effective in operation, which may be readily attached to various forms of corn planters now in use in which wires are not required for checking the rows and which may be cheaply constructed and easily operated.

A further object is to provide an attachment in which a spacing or checking wheel may be readily removed and another of greater or less diameter substituted therefor, thus varying the gage of drop or width of rows as may be desired.

In the accompanying drawing I have shown generally a corn planter of well-known form, to which my improvement has been applied, so as to more clearly show the operative connection of my invention, but will not describe in detail the various parts of the machine except so far as they affect or are affected by my improved attachment.

Referring to the drawing:—Figure 1 is a side elevation of a corn planter having my attachment applied thereto, it being understood that certain details of the machine which have no bearing on my invention are either omitted or only partially shown; Fig. 2 is a top plan view of the machine shown in Fig. 1, and Fig. 3 is a fragmentary detail of the essential features of my invention.

Referring to the details of the drawing 4 represents the side bars of the main frame of the machine, on which is supported the driver's seat, the operating lever 29 and its coöperating parts 33, 35 and 36, said frame being mounted on and supported by the axle 5 and ground wheels 6, all of said parts being constructed and arranged in a well known manner. The front ends of the side bars of frame 4 are pivotally connected with lugs 38 on the front auxiliary frame bar 4ª. The ends of the auxiliary frame are rigidly secured to the angle-bar 4ᵇ which extends transversely of the machine, and together, with the auxiliary frame, furnishes a support for the seed boxes 7 and their coöperating elements. The frame bar 4ª is bolted midway its ends to the tongue 9. The upper ends of the shoes or furrow openers 8 are bolted to the frame bar 4ª, and the seed-chutes 8ª are secured at their lower ends to the shoes, and at their upper ends, to the frame bar 4ᵇ, in any approved manner.

Pivoted in the rear side of the chutes are forked arms 8ᵇ the forked ends of which engage the yokes 12 which are fixed on the rocking bar 10. The yokes are connected with one end of pawls 11, the other end of which engages and operates the seed-plates in a well-known manner and hence not shown in details. Connected with the axle, and the ocking-bar is a spring 34 the tension of which is exerted to maintain the rocking bar in normal position.

Braces 37 extend rearwardly from the tongue and their rear ends are connected with a rod on which is mounted a compression coil-spring and the upper end of the rod is pivoted in the forward end of an arm 36, the rear end of which is connected or integral with a sleeve 30 on the shaft 31. The hand lever 29 is rigidly connected with said sleeve, and the shaft 31 has a fixed bearing 32 at one end, and in the segment 33 at its other end. The lever is equipped with the usual pawl 35 for engaging the teeth of the segment to lock it in adjusted positions. The operation of the lever raises and lowers the auxiliary frame and its connected parts. The parts above described are of usual construction and constitute *per se* no part of my invention.

On the rocking bar 10 is fixed a collar 27 which is connected by a bolt 28 with the rear end of a pitman 26, the forward end of which is pivoted on the upper end of the lever 24 which is pivoted at one side of the tongue 9 by pivot 25.

From the under side of the tongue hang braces 13 and 14, which support a journal-box 15, which is held in place by bolts 16 passing through the lower portion of the braces 13 and 14. Journaled in the box 15 is an axle 17 on which is mounted a spacing wheel or disk 19 formed with a central hub 18 and provided with peripheral spurs or teeth 20. Near the periphery of the wheel is set a pin 23 which projects at right angles from the face of the wheel. At a point on the opposite side of the hub from the pin 23 and on the other face of the wheel plate is secured an angular plate 21, the horizontal member of which is near the peripheral edge of the wheel, as clearly shown in Fig. 3. The lower end of the lever 24 extends into the plane of rotation of the pin 23, so that as the wheel 19 rotates the lever will be tripped at each revolution. The tripping of the lever actuates the pitman 26, which in turn, rocks the bar 10 and thereby operates the seed dropping devices connected with the bar.

It will be apparent that by substituting for the wheel 19 one of a different diameter or by setting the pin 23 at varying distances from the axis of the wheel, the path traversed by the pin may be increased or diminished and thus the intervals between the lever tripping operations varied accordingly.

As the angular plate 21 is set at 180 degrees to the pin 23, each engagement of the pin with the lever is noted by the contact of the plate with the soil, thus leaving a mark or slight depression midway between the rows being planted as a guide for the operator in running the cross-rows.

The spurs 20 are of such size and shape as may be best adapted to the character of the soil in which the planter is used, and the well understood functions of the wheel to which they are secured.

As the pin 23 may accumulate soil in the operation of the machine, and thus cause the lever to trip prematurely or at irregular intervals, it becomes desirable to keep the pin clean, and for this purpose I attach to the tongue 9 by a bolt 23ᵇ, a spring 23ᵃ the free end of which extends into the path of the pin so that it serves as a wiper for the latter.

Having thus described my invention what I claim is:—

1. In a seed planting machine comprising a tongue, supporting frames and seed-holding and planting devices, including a rocking-bar, a lever pivoted on the tongue, means operatively connecting the lever with the rocking-bar, a traction wheel suspended from said tongue and means on said wheel adapted to trip said lever upon the rotation of the wheel.

2. In a seed planting machine comprising a tongue, supporting frames, and seed holding and planting devices, including a rocking-bar, a lever pivoted on the tongue, a rod connecting the lever with the bar, a traction wheel suspended from said tongue, means on said wheel adapted to trip said lever upon the rotation of the wheel, and means on said wheel for indicating on the soil the operations of said tripping device.

3. In a seed planting machine comprising seed-holding and planting means, a traction wheel, a marking device attached to said wheel a wiper for cleaning said marking device, a tripping device secured to said wheel, a lever adapted to be operated by said tripping device, and means connecting said lever with said seed holding and planting means.

4. In a seed planting machine, a traction wheel comprising an adjustable tripping device, a marking device, and means for preventing clogging of said marking device.

In testimony whereof I affix my signature in presence of two witnesses.

CHRISTOPHER ANDERSON.

Witnesses:
JAMES F. MURPHY,
GEORGE C. WENGER.